United States Patent
Mathiaparanam et al.

(10) Patent No.: US 7,125,824 B2
(45) Date of Patent: Oct. 24, 2006

(54) LINERLESS LABELS

(75) Inventors: Ponnampalam Mathiaparanam, Appleton, WI (US); Mark Robert Fisher, Appleton, WI (US); Stacey Ann Justa MacNeil, Appleton, WI (US)

(73) Assignee: Appleton Papers Inc., Appleton, WI (US)

( * ) Notice: Subject to any disclaimer, the term of this patent is extended or adjusted under 35 U.S.C. 154(b) by 402 days.

(21) Appl. No.: 10/848,148

(22) Filed: May 19, 2004

(65) Prior Publication Data

US 2004/0234756 A1 Nov. 25, 2004

Related U.S. Application Data

(60) Provisional application No. 60/472,459, filed on May 22, 2003.

(51) Int. Cl.
*B41M 5/30* (2006.01)
(52) U.S. Cl. ............... 503/220; 503/200; 503/209; 503/217
(58) Field of Classification Search ............ 503/200, 503/209, 217, 220
See application file for complete search history.

(56) References Cited

U.S. PATENT DOCUMENTS 4,470,057 A 9/1984 Glanz ............... 346/209

(Continued)

OTHER PUBLICATIONS

Article Entitled Principles of Nonimpact Printing, Second Edition by Jerome L. Johnson.

(Continued)

*Primary Examiner*—Bruce H. Hess
(74) *Attorney, Agent, or Firm*—Benjamin Mieliulis (57) ABSTRACT

A linerless label system comprising pressure adhesive coating, release coating and thermal imaging coating is described. The thermal imaging coating contains as one of its components the compounds of the formula (I)

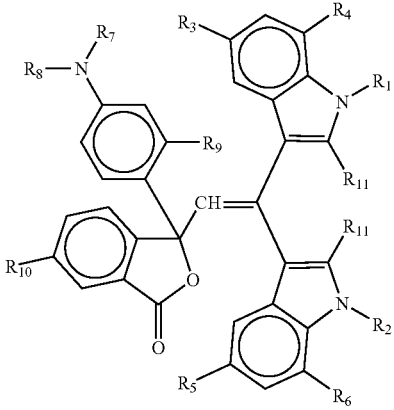

wherein $R_1$ and $R_2$ are selected from methyl, ethyl, aryl, aryl substituted with methyl, ethyl, methoxy, ethoxy or halogen, benzyl or benzyl with phenyl substituted with methyl, ethyl, methoxy, ethoxy or halogen, $R_3, R_4, R_5$ and $R_6$ are selected from hydrogen, halogen, methyl, ethyl, methoxy, ethoxy, phenyl, $R_7$ and $R_8$ are each independently selected from methyl or ethyl, $R_9$ is selected from hydrogen, methoxy or ethoxy, $R_{10}$ is selected from hydrogen, dimethylamino or diethylamino, $R_{11}$ is methyl.

The imaged linerless label according to the invention has been a bar reflectance of less than 20 at 670 nanometers, a print control contrast signal of at least 80 and a BNL background of at least 75%.

18 Claims, 3 Drawing Sheets

U.S. PATENT DOCUMENTS

| | | | |
|---|---|---|---|
| 5,200,519 A | 4/1993 | Mathiaparanam | 544/144 |
| 5,218,127 A | 6/1993 | Mathiaparanam | 548/456 |
| 5,292,713 A | 3/1994 | Stenzel et al. | 503/226 |
| 5,547,738 A | 8/1996 | Mitchell et al. | 428/195 |
| 5,804,528 A * | 9/1998 | Aoki et al. | 503/204 |

OTHER PUBLICATIONS

Article Entitled "Near Infrared": Enhanced Direct Thermal Media Needed for Growing Scanning Segment dated May 26, 1994.

Japanese Patent Application No. H6 [1994]-135156 Published May 17, 1994.

Japanese Patent Application No. Hei 8[1996]-282129 Published Oct. 29, 1996.

* cited by examiner

LINERLESS LABELS

This Application under 35 USC § 111(a) claims benefit per 35 USC § 119(e) to application Ser. No. 60/472,459 filed May 22, 2003 as a provisional application per 35 USC 111(b).

FIELD OF THE INVENTION

Background of the Invention

This invention relates to linerless labels, and in particular to linerless labels having pressure sensitive adhesive coatings.

DESCRIPTION OF RELATED ART

Linerless labels are taught in U.S. Pat. Nos. 3,051,588; 3,285,771; 4,851,383 and 5,547,738 which are incorporated herein by reference. Linerless labels have certain advantages over pressure sensitive labels which are mounted on a liner having a release coating. In conventional labels, the liner acts as a support for transport, printing and storage but constitutes a ply that must be discarded after the label is removed from the liner.

Linerless labels are an improvement having a face surface coated with a release coat and a back surface that is coated with a pressure sensitive adhesive. A strip of linerless labels can be wound into a spiral roll configuration so that the pressure-sensitive adhesive on the back surface is in contact with the release coating on the face surface of the strip, where the release coating faces outwardly. The adhesion between the pressure sensitive adhesive and release coat holds the strip in a roll. Labels can be peeled off individually from the roll of linerless labels without having a liner ply to remove and discard each time a label is used.

Since a liner web or ply is not needed in a roll of linerless labels, material and cost savings are achievable. Elimination of the liner ply not only saves materials, but also saves disposal cost and material handling costs. A savings in space is also realized in that a roll of linerless labels can have approximately twice as many labels as the same size roll of labels with a liner ply.

Usefully, linerless labels can be fashioned with a thermal imaging coating on the face surface. Over the thermal imaging coat, a release coat is applied.

The release coat and constituents of the pressure sensitive adhesive sometimes however can obscure or smear aspects of a pre-printed image or interfere with the thermal imaging chemistry of the thermal imaging coating, giving rise to problems related to poor imaging characteristics, image fade, obscured optical reflectance and the like resulting in misreads when the labels are attempted to be subjected to optical scanning. This results in a low percentage of successful decodes especially when a bar code is thermally imaged on the linerless label.

Thermal-responsive record material systems are well known in the art and are described in many patents, for example, U.S. Pat. Nos. 3,539,375; 3,674,535; 3,746,675; 4,151,748; 4,181,771; 4,246,318; and 4,470,057 which are incorporated herein by reference. In these systems, basic chromogenic material and acidic color developer material are contained in a coating on a substrate which, when heated to a suitable temperature, melts, sublimes or softens to permit said materials to react, thereby producing a colored mark.

Thermal-responsive record materials have characteristic thermal responses, desirably producing a detectable image of certain intensity upon thermal exposure which can be in a selective pattern to record or convey characters, images or other information. A known drawback of thermal-responsive record materials limiting utilization has been the limitations of thermal responsive record material images in terms of image stability, when in direct contact with other materials such as plasticizers or adhesives and retention of ability to be optically scanned.

As usage of the bar codes have increased, a demand is arising for linerless labels having a thermal imaging coating that is able to be optically scanned with a high percentage of successful decodes despite contact of the thermal imaging coating with adhesives, adhesive constituents, release coat, coating debris or print smearing or obscuring.

For widespread acceptance of linerless labels, based on thermal imaging the linerless label stock must be commercially useful for optical scanning when imaged.

A critical measurement in determining the machine readability is the Print Contrast Signal (PCS).

Print Contrast Signal (PCS) is defined as:

$$PCS = \frac{(R_L - R_D)}{R_L} \times 100\%$$

Where:
$R_L$=Reflectance of Background
$R_D$=Reflectance of Image

PCS measures the difference in reflectance between the background and image. PCS values greater than 75% give excellent machine readability. Systems having background reflectance greater than 85% and image reflectance less than 18% are of commercial significance.

Adequate print contrast depends on maintaining the proper image and background contrasts. Larger PCS values lead to greater print contrasts and lesser decode malfunctions.

Conventional thermal imaging systems lose sensitivity when release coat and adhesive coat are applied as shown by diminished PCS values. Additional chromogenic materials are added to compensate the loss of PCS values. Also, the thermal imaging coat is exposed to heat from UV light, E beam and polymerization during curing process that gives rise to poor appearance unacceptable to the user.

Particularly with bar codes, in order to recognize individual bars and spaces and decode a symbol, it is necessary for the scanner to differentiate between the reflectance of the individual bar code elements. The level of contrast between bars and spaces must meet a certain level of contrast as shown by PCS values.

Bar reflectance is a measure of the reflectance of the bars of the bar code. A need exists for thermal imaging linerless label stock which when imaged has absorption above 650 nm but at the same time has bar reflectance values of less than 20@670 nm. Such linerless labels would be an advance in the art and of commercial significance.

It is an object of the present invention to disclose a heat sensitive record materials which when thermally imaged exhibit absorption above 650 nm but at the same time have bar reflectance values of less than 20@670 nm and a BNL background of at least 75%. The linerless labels of the invention have an intense image, and resistance to fade. Furthermore, the system's reflectance characteristics are substantially resistant to adhesive constituents of the pressure sensitive adhesive coat or the release coat.

DETAILED DESCRIPTION

The present invention is an improved thermal imaging linerless label stock useful for optical scanning comprising a substrate having first and second surfaces, and having coating on the first and second surface.

The coatings on the first surface comprise a pressure sensitive adhesive.

The coatings on the second surface comprise a thermal imaging coating, the thermal-imaging coating containing at least one chromogenic material having a bar reflectance of less than 20 at 670 nanometers, the chromogenic material is selected from compounds of the formula (I)

(I)

wherein $R_1$ and $R_2$ are selected from methyl, ethyl, aryl, aryl substituted with methyl, ethyl, methoxy, ethoxy or halogen, benzyl or benzyl with phenyl substituted with methyl, ethyl, methoxy, ethoxy or halogen, wherein $R_3, R_4, R_5$ and $R_6$ are selected from hydrogen, halogen, methyl, ethyl, methoxy, ethoxy or phenyl, wherein $R_7$ and $R_8$ are each independently selected from methyl or ethyl, wherein $R_9$ is selected from hydrogen, methoxy or ethoxy, wherein $R_{10}$ is selected from hydrogen, dimethylamino or diethylamino, wherein $R_{11}$ is methyl, and at least one developer. Preferably the developer material is a material of the formula (II)

(II)

The label stock can have a spiral configuration such that the pressure sensitive adhesive adheres to the release coat to maintain the roll configuration, and wherein the stock may be peeled off the roll at the outer end of the roll.

When the developer material of formula II is utilized surprising unexpected improvements in intensity, bar code readability and background are achievable as compared to other developers.

Figure 6:
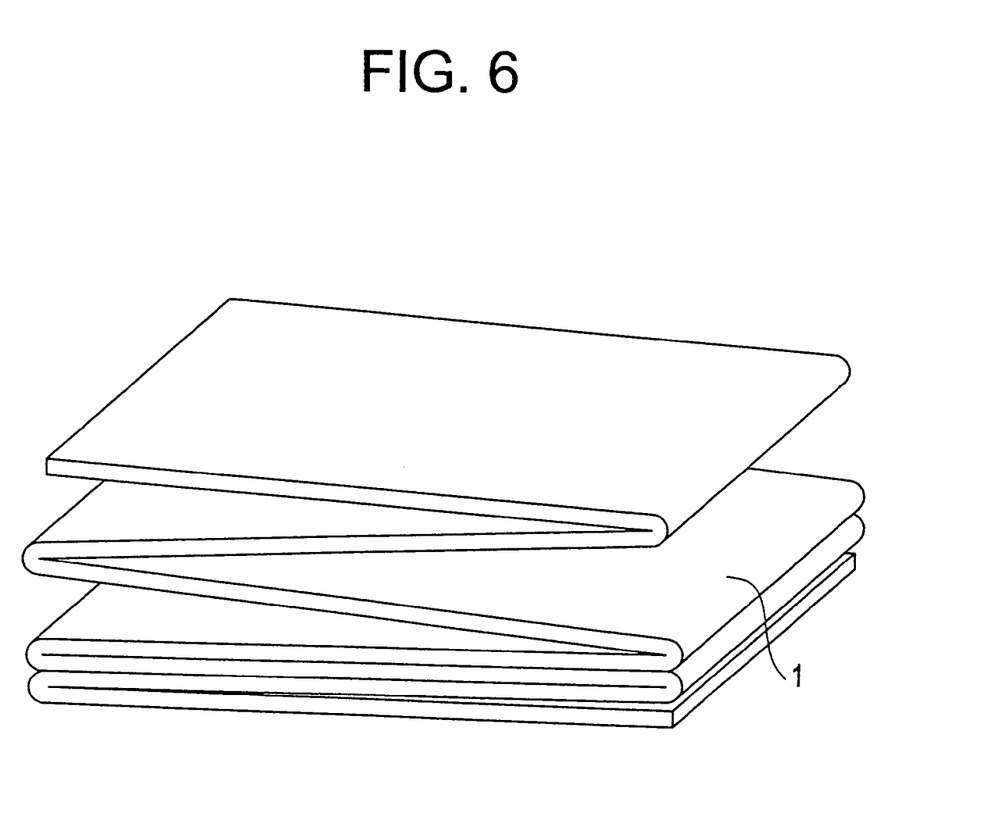
FIG. 6 is a side view of a Z configuration alternative embodiment of a thermal imaging linerless label stock.

The linerless label stock 1 can be fashioned as a spiral roll. Other configurations can include a stack folded in a collapsed Z type of configuration as shown in FIG. 6. The spiral roll format is preferred.

The thermal imaging linerless label stack of the invention exhibits an intense image of high contrast on a low background. The linerless label of the invention surprising has bar reflectance values of less than 20 at 670 nm and a print contrast signal in excess of 80.

It has been found that the indole moiety, surprisingly gives rise to a class of compounds having unique and unexpected characteristics in terms of resistance to image fade when subjected to a variety of environmental challenges.

This class of compounds enables manufacture of a unique linerless label especially suitable for optical scanning.

Figure 1:
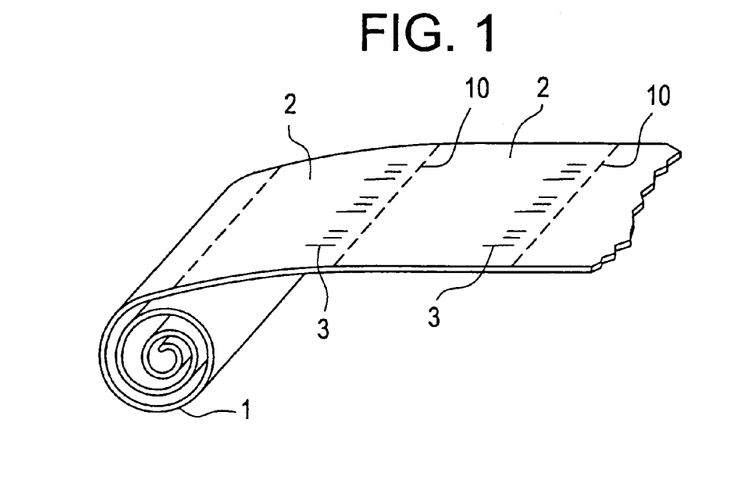
FIG. 1 depicts an embodiment of a thermal imaging linerless label stock according to the invention.

An example of linerless label stock is depicted in FIG. 1. Linerless label stock is shown in a spiral roll form. The labels 2 can have an imaged optional bar code 3. Labels 2 can be pre-cut or die cut as needed. FIG. 1 shows the labels as having perforations as separation lines between the labels to make separation of individual labels easier.

Figure 2:
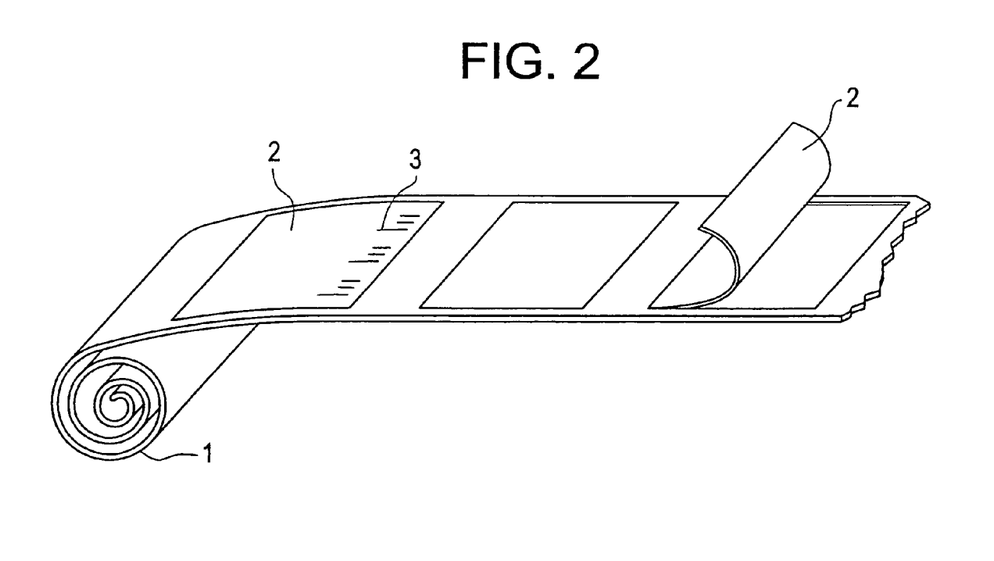
FIG. 2 is an alternate embodiment.

FIG. 2 illustrates an alternative embodiment of the thermal imaging label stock. In this embodiment the side edges of the label 2 does not correspond to the side edges of the substrate. The labels can be rectangular, square, quadrate, round, oval or any other shape. There is some waste from the remaining skeletal structure of the substrate when label 2 is cut from linerless label stock 1. Optional bar code 3 is shown imaged on label 2.

Aspects such as a bar code are conveniently imaged by imaging the thermal imaging coating. As an alternative, any type of indicia can also be printed by conventional printing techniques adding versatility depending on the application.

Figure 3:
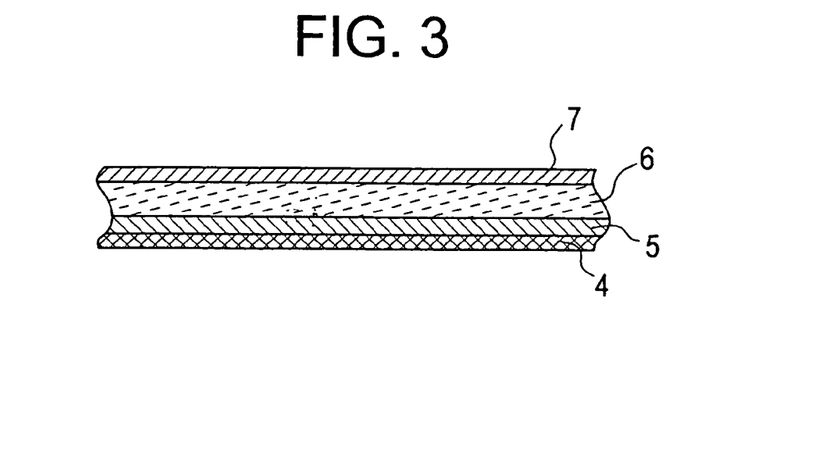
FIG. 3 is a cross section of a thermal imaging linerless label stock according to the invention.

FIG. 3 is a cross section of a thermal imaging linerless label stock. A substrate such as paper 6 can be coated with a thermal imaging coating 5 which can itself comprise one or more layers. A release layer 4 is applied over the thermal imaging coating layer or layers. On the opposite or first surface of paper 6, a pressure sensitive adhesive layer 7 is applied.

Figure 4:
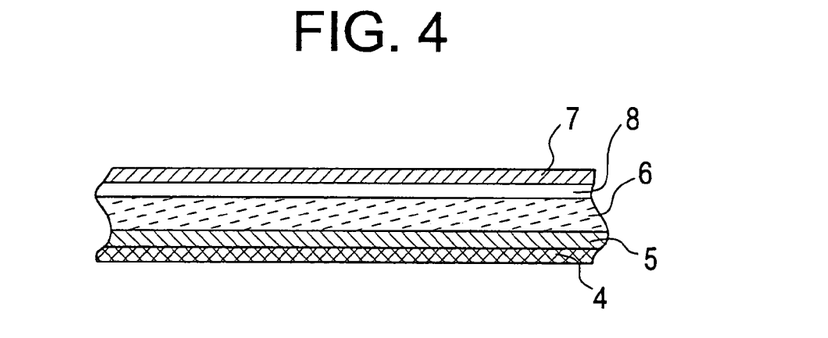
FIG. 4 is a cross section of an alternate embodiment.

FIG. 4 is a cross section of an alternate embodiment. Many variations of additional coatings will be evident to the skilled artisan. FIG. 4 adds tie coat 8 to facilitate adherence of the adhesive layer 7 to paper 6. Desirably, when wound in a spiral roll form, it is desirable for the adhesive to preferentially release from the release coat while continuing to adhere to the tie coat on the paper surface.

The optional tie coat can be selected from any of the well known materials used for this purpose such as ethylene vinyl acetate, polyvinyl alcohol, pigments such as silica, binders and pigment, and similar material such as disclosed in U.S. Pat. No. 5,547,738 incorporated herein by reference.

Figure 5:
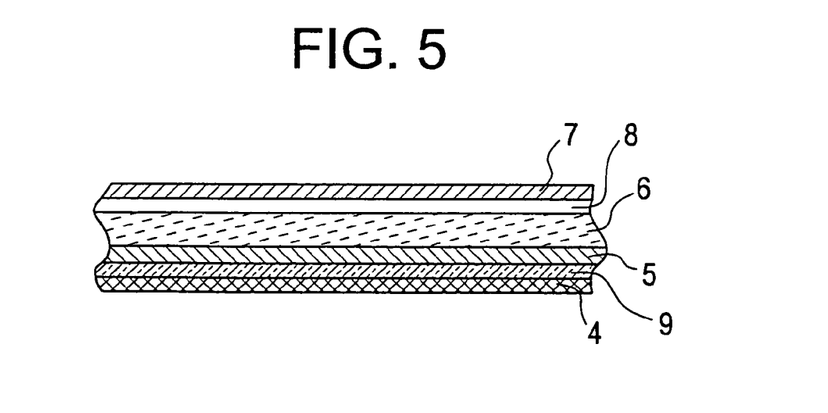
FIG. 5 depicts a cross section of another alternate embodiment of a thermal imaging linerless label stock.

FIG. 5 is a cross section of another alternate embodiment of a thermal imaging linerless label stock. Top coat 9 can be optionally applied in one or more layers over the thermal imaging coating layer or layers 5.

Illustrative compounds according to Formula (I) are:

(1)

(2)

(3)

-continued

(4)

(5)

(6)

(7)

(8)

(9)

(10)

(11)

(12)

(13)

(14)

-continued

The liner in conventional thermosensitive labels acts as a support for transport, printing and storage, and once the label is removed this liner is discarded. Substantial savings can be realized in material and disposal costs of these liners by using linerless labels. A roll of linerless labels can hold twice as many labels as the same size roll of labels with liners and as a result considerable savings are realized in space for storage and transport. Linerless thermosensitive label stock, in its simplest form, is formed by applying a release coating over the thermosensitive layer on a first face of the substrate and a pressure sensitive adhesive coating to a second face of a substrate. A strip of linerless labels may be wound into a roll in such manner that the pressure sensitive adhesive layer on the backside of the strip is in contact with the release coating layer and the release coating faces outwardly.

Numerous modifications are possible on the coating configurations of linerless labels depending on the need as well as the environment in which they are used. For example, a tie coat can be applied between the substrate and the pressure sensitive adhesive layer to help keep the latter from peeling off the substrate during use. Also, a top coat may be used between the thermal sensitive layer and release coating, and a subcoat may be applied between the second face of the substrate and the pressure sensitive adhesive coating. Any combination of tie coat, top coat, sub coat and other coats may be used for the linerless label product of the invention.

The compositions of pressure sensitive adhesive coating and release coating are selected so that they are incompatible and this makes the separation of labels easier due to reduced cohesive forces between the coatings. Examples of release coats include: polyamides (e.g. proteins), polyacrylate esters, polyurethanes, polyesters, polyethylenes, waxes and copolymers like ethylene/acrylic acid etc.

The thermally imaging coating can be one or more layers and can comprise a chromogenic material and an acidic developer material in substantially contiguous relationship, whereby the melting, softening or sublimation of either material produces a color, in other words a change-in-color reaction.

A sensitizer (also known as a modifier) such as a 1,2-diphenoxyethane and the like is preferably included. Such material typically does not impart any image on its own and is not considered active in the formation of color but as a relatively low melting solid acts as a solvent to facilitate reaction between the mark-forming components. Other such sensitizers are described in U.S. Pat. No. 4,531,140. Other sensitizers for example can include N-acetoacetyl-o-toluidine, phenyl-1-hydroxy-2-naphthoate, dibenzyloxalate, para-benzylbiphenyl, caproic acid amide, captic amide, palmitic acid amide, stearic acid amide, oleic amide, erucic amide, linoleic acid amide, N-methyl stearic acid amide, stearic acid anilide, N-methyl oleic amide, benzanilide, linoleic acid anilide, N-ethyl capric amide, N-butyl lauric acid amide, N-octadecyl acetamide, N-oleyl acetamide, N-oleyl benzamide, N-stearyl cyclohexylamide, polyethylene glycol, 1-benzyloxynaphthalene, 2-benzyloxynaphthalene, phyenyl 1-hydroxynaphthoate, 1,2-diphenoxyethane, 1,4-diphenoxybutane, 1,2-bis(3-methylphenoxy)ethane, 1,2-bis(4-methoxyphenoxy)ethane, 1-phenoxy-2-(4-chlorophenoxy)ethane, 1-phenoxy-2-(4-methoxyphenoxy) ethane, 1-(2-methylphenoxy)-2-(4-methoxyphenoxy) ethane, dibenzy terephthalate, dibenzyl oxalate, di(4-methylbenzyl) oxalate, benzyl p-benzyloxybenzoate, p-benzylbiphenyl, 1,5-bis(p-methoxyphenoxy)-3-oxa-pentane, 1,4-bis(2-vinyloxyethoxy)benzene, p-biphenyl p-tolyl ether, benzyl p-methylthiophenyl ether, 2-(2'-hydroxy-5-'methylphenyl)benzotriazole, 2-hydroxy-4-benzyloxybenzophenone and the like.

The color-forming composition comprises chromogenic mono(indolylethylenyl)phthalides according to Formula I in their substantially colorless state and acidic developer material. Chromogenic materials are also known as color formers or dye precursors. They are typically electron donors. The dye precursors or chromogenic materials react with acidic developer material to express a dye. The color-forming system typically relies upon melting, softening, or subliming one or more of the components to achieve reactive, color-producing contact.

The substrate is understood to encompass paper (rolls or stacked sheets)and synthetic webs, ribbons, tapes, belts, films, and the like. These articles typically have two large surface dimensions and a comparatively small thickness dimension. The substrate can be opaque, transparent or translucent and could, itself, be colored or not. The material can be fibrous including, for example, paper and filamentous synthetic materials. It can be a film including, for example, cellophane and synthetic polymeric sheets cast, extruded, or otherwise formed.

The thermal imaging coating comprises the color-forming composition chromogenic materials of Formula I positioned proximate to the developer material of Formula II.

The components of the color-forming system are in a proximate relationship meaning, substantially contiguous or near contiguous relationship, substantially homogeneously distributed throughout the coated thermally imaging layer material deposited on the substrate which can be in one or more layers. One layer could be chromogenic material. Developer could be included in this layer or in a separate layer. Similarly a sensitizer could be included in the chromogenic material layer, or in the developer layer or as a separate layer. Curtain coating is especially useful to achieve such layering. Various such layering techniques are meant by the term proximate relationship. In manufacturing the thermally imaging coat material, a coating composition is prepared which includes a fine dispersion of the components of the color-forming system, binder material typically a polymeric material, surface active agents and other additives in an aqueous coating medium. A protective topcoat layer 9 typically polymeric such as polyvinylalcohol or its derivatives or other binder materials, with or without UV absorbers, antioxidants, can be optionally utilized. Any of the layers, but particularly the colorforming system layers can additionally contain inert pigments, such as clay, talc, aluminum hydroxide, calcined kaolin clay and calcium carbonate; synthetic pigments, such as urea-formaldehyde resin pigments; natural waxes such as Carnauba wax; synthetic waxes; lubricants such as zinc stearate; wetting agents; defoamers, and antioxidants.

The color-forming system components are substantially insoluble in the dispersing vehicle (preferably water) and are ground to an individual average particle size of between about 1 micron to about 10 microns, preferably less than 3 microns. A binder can be included. The binder can be a polymeric material and is substantially vehicle soluble although latexes are also eligible in some instances. Preferred water soluble binders include polyvinyl alcohol, hydroxyethylcellulose, methylcellulose, methyl(hydroxypropyl)cellulose, starch, styrene maleic anhydride salts, modified starches, gelatin and the like. Eligible latex materials include polyacrylates, styrene-butadiene-rubber latexes, polyvinylacetates, polystyrene, and the like. The polymeric binder is used to protect the coated materials from brushing and handling forces occasioned by storage and use of the sheet or label. Binder should be present in an amount to afford such protection and in an amount less than will interfere with achieving reactive contact between color-forming reactive materials.

Thermal imaging coating weights can effectively be about 3 to about 9 grams per square meter (gsm) and preferably about 5 to about 6 gsm. The practical amount of color-forming materials is controlled by economic considerations, functional parameters and desired handling characteristics of the coated labels.

In addition to the mono(indolyethylenyl)phthalides of Formula I, other chromogenic materials can be included in combination. These additional chromogens could include any of the conventional chromogens such as the phthalide, leucoauramine and fluoran compounds. Other examples of chromogen compounds include Crystal Violet Lactone (3,3-bis(4-dimethylaminophenyl)-6-dimethylaminophthalide, U.S. Pat. No. Re. 23,024); phenyl-, indolyl, pyrrolyl, and carbazolyl substituted phthalides (for example, in U.S. Pat. Nos. 3,491,111; 3,491,112; 3,491,116; 3,509,174); nitro-, amino-, amido-, sulfonamido-, aminobenzylidene-, halo-, anilino-substituted fluorans (for example, in U.S. Pat. Nos. 3,624,107; 3,627,787; 3,641,011; 3,642,828; 3,681,390); spirodipyrans (U.S. Pat. No. 3,971,808); and pyridine and pyrazine compounds (for example, in U.S. Pat. Nos. 3,775,424 and 3,853,869).

Other specifically eligible chromogenic compounds which can be used in combination include 3-diethylamino-6-methyl-7-anilino-fluoran (U.S. Pat. No. 3,681,390); 2-anilino-3-methyl-6-dibutylamino-fluoran (U.S. Pat. No. 4,510,513) also known as 3-di-n-butylamino-6-methyl-7-anilino-fluoran; 3-di-n-butylamino-7-(2-chloroanilino)fluoran; 3-(N-ethyl-N-tetrahydrofurfurylamino)-6-methyl-7-3,5'6-tris(dimethylamino)spiro[9H-fluorene-9,1'(3'H)-isobenzofuran]3'-one; 7-(1-ethyl-2-methylindole-3-yl)-7-(4-diethylamino-2-ethoxyphenyl)-5,7-dihydrofuro[3,4-b]pyridin-5-one (U.S. Pat. No. 4,246,318); 3-diethylamino-7-(2-chloroanilino)fluoran (U.S. Pat. No. 3,920,510); 3-(N-methylcyclohexylamino)-6-methyl-7-anilinofluoran (U.S. Pat. No. 3,959,571); 7-(1-octyl-2-methylindole-3-yl)-7-(4-diethylamino-2-ethoxyphenyl)-5,7-dihydrofuro[3,4-b]pyridin-5-one; 3-diethylamino-7,8-benzofluoran; 3-diethylamino-7-anilinofluoran; 3-diethylamino-7-benzylaminofluoran; 3'-phenyl-7-dibenzylamino-2,2'-spirodi-[2H-1-benzopyran] and mixtures of any of the above.

In addition to the developer of Formula II, other developer materials can be used in combination. Developers other than Formula II when used alone, although functional do not exhibit the same degree of unexpected improvements in intensity, bar code readability and background. Examples of such other eligible acidic (or electron accepting) color-developer material include the compounds listed in U.S. Pat. No. 3,539,375 as phenolic reactive material, particularly the monophenols and diphenols. Other eligible acidic developer materials also include, without being considered as limiting, the following compounds which may be used individually or in mixtures: 4,4'-isopropylidine-diphenol (Bisphenol A); p-hydroxybenzaldehyde; p-hydroxybenzophenone; p-hydroxypropiophenone; 2,4-dihydroxybenzophenone; 1,1-bis(4-hydroxyphenyl)cyclohexane; salicylanilide; 4-hydroxy-2-methylacetophenone; 2-acetylbenzoic acid; m-hydroxyacetanilide; p-hydroxyacetanilide; 2,4-dihydroxyacetophenone; 4-hydroxy-4'-methylbenzophenone; 4,4'-dihydroxybenzophenone; 2,2-bis(4-hydroxyphenyl)-4-methylpentane; benzyl-4-hydroxyphenyl ketone; 2,2-bis(4-hydroxyphenyl)-5-methylhexane; ethyl[4,4-bis(4-hydroxyphenyl)]pentanoate; isopropyl[4,4-bis(4-hydroxyphenyl)]pentanoate; methyl[4,4-bis(4-hydroxyphenyl)]pentanoate; allyl[4,4-bis(4-hydroxyphenyl)]pentanoate; 3,3-bis(4-hydroxyphenyl)pentane; 4,4-bis(4-hydroxyphenyl)heptane; 2,2-bis(4-hydroxyphenyl)-1-phenylpropane; 2,2-bis(4-hydroxyphenyl)butane; 2,2'-methylene-bis(4-ethyl-6-tertiary-butylphenol); 4-hydroxycoumarin; 7-hydroxy-4-methylcoumarin; 2,2'-methylene-bis(4-octylphenol); 4,4'-sulfonyldiphenol; 4,4'-thiobis(6-tertiarybutyl-m-cresol); methyl-p-hydroxybenzoate; n-propyl p-hydroxybenzoate; benzyl p-hydroxybenzoate; 4-(4-(1-methylethoxy)phenyl) sulphonyl phenol. Preferred among these are the phenolic developer compounds. More preferred among the phenol compounds are 4,4'-isopropylidinediphenol, ethyl[4,4-bis (4hydroxyphenyl)]pentanoate, n-propyl[4,4-bis(4-hydroxyphenyl)]pentanoate, isopropyl[4,4-bis(4-hydroxyphenyl)] pentanoate, methyl[4,4-bis(4-hydroxyphenyl)]pentanoate, 2,2-bis(4-hydroxyphenyl)-4-methylpentane, p-hydroxybenzophenone, 2,4-dihydroxybenzophenone, 1,1-bis(4-hydroxyphenyl)cyclohexane, and benzyl-p-hydroxybenzoate; 4-(4-(1-methylethoxy)phenyl)sulphonyl phenol and 4,4'-[1,3-phenylenebis(1-methylethylene)]bisphenol. Acidic compounds of other kind and types are eligible. Examples of such other acidic developer compounds are phenolic novolak resins which are the product of reaction between, for example, formaldehyde and a phenol such as an alkylphenol, e.g., p-octylphenol, or other phenols such as p-phenylphenol, and the like; and acid mineral materials including colloidal silica, kaolin, bentonite, attapulgite, hallosyte, and the like. Some of the polymers and minerals do not melt but undergo color reaction on fusion of the chromogen. Of the foregoing particularly the phenol type of compounds are more preferable acidic developer materials.

The following examples are given to illustrate some of the features of the present invention and should not be considered as limiting. In these examples all parts or proportions are by weight and all measurements are in the metric system, unless otherwise stated.

In all examples illustrating the present invention a dispersion of a particular system component was prepared by milling the component in an aqueous solution of the binder until a particle size of between about 1 micron and 10 microns was achieved. The desired average particle size was less than 3 microns in each dispersion.

The thermally imaging coat was made by making separate dispersions of chromogenic material and acidic material. The dispersions were mixed in the desired ratios and the applied to the substrate with a wire wound rod and dried. Other non-active (as that term is understood in this application) materials such as modifiers, fillers, antioxidants, lubricants and waxes can be added if desired. The label stock may be calendered to improve smoothness.

The pressure sensitive adhesive can take the form of any of a variety solvent-based, water-based, hot melt, microwave or radiation curable formulations. Various acrylate, methacrylate, styrene butadiene copolymer pressure sensitive adhesives are known. Pressure sensitive adhesive compositions are taught in patents such as U.S. Pat. Nos. 6,423,392; 6,218,006; 5,827,609; and 5,738,939 incorporated herein by reference.

Examples of pressure sensitive adhesive includes silicones, polyolefins, polyurethanes, polyesters, acrylics, epoxies, rubber-resin, and polyamides. Suitable pressure sensitive adhesives include solvent-coatable, hot-melt-coatable, radiation-curable (E-bearn or UV curable) and water-based emulsion type adhesives that are well-known in the art. Specific examples of suitable adhesives include acrylic-based adhesives, e.g., isooctyl, acrylate/acrylic acid copolymers and tackified acrylate copolymers; tackified rubber-based adhesives, e.g., tackified styrene-isoprene-styrene block copolymers; tackified styrene-butadiene-styrene block copolymers; nitrile rubbers, e.g., acrylonitrile-butadiene; silicone-based adhesive, e.g., polysiloxanes; and polyurethanes. Typical thickness of the adhesive layers are 10 microns to 1000 microns and usefully 25 microns to 250 microns.

Optionally, the pressure sensitive adhesive can be microencapsulated or incorporated in a matrix material such as a rupturable polymeric material or rupturable gel. Microencapsulated pressure sensitive adhesives are known in the art and are often conveniently classified based upon mode of activation, extent of component microencapsulation, adhesive chemistry, or suitability for various surfaces. Microencapsulated adhesives can be optionally and usefully adapted as the pressure sensitive adhesive of the thermally imaging linerless label stock.

Microencapsulated pressure sensitive adhesives can involve solvent-based systems or reactive or curable resin systems. Solvent-based systems rely on adhesive reactivation through solvent delivery. Microcapsules can be used as the vehicle to retain the solvent until needed. Other activatable systems rely on the plasticizer or UV initiator being encapsulated in place of solvent in order to tackify the resin at the time of use.

Capsules containing a solvent for the adhesive are typically dispersed throughout a nontacky adhesive coating on a substrate. Upon rupture of the capsules, a solvent is released making the adhesive tacky. A plasticizer can similarly be encapsulated and used in place of or in conjunction with a solvent to tackify the adhesive.

Reactive resin systems typically involve an encapsulated curing system. Either the total formulation, the total adhesive or one component can be encapsulated. Reactive components typically must be isolated or kept separate until use. Typically one or two separate encapsulations can be used. Reactive systems typically employ epoxy resins, isocyanates, polyesters and the like.

Another form of encapsulated adhesive is the self-contained capsule. The complete adhesive can be encapsulated, and applied to the substrate surface with a binder. Alternatively, a curing agent can be adhered to the capsule surface. Upon rupture of the capsule wall, the resin flows to contact the curing agent. Curing agents can include boron trifluoride complexes, nitrile or aniline type catalysts, acid chlorides, hexamethylenetetramine, various oxides, dibutyltin dilaurate and the like.

Capsule release mechanisms can involve pressure, heat or dissolution of the capsule wall. Heat activated systems thermally cure upon heating above the activation temperature. With all such systems pressure on the adhesive label is used to affix the label.

EXAMPLES

In the following examples, general procedures general procedures for preparing certain compounds listed above are described; the examples are not intended to be exhaustive and the moieties, as previously defined, all eligible for use in any combination in preparing the compounds. Unless otherwise noted, all measurements, percentages and parts are by weight.

Example 1

Preparation of 3-[1,1-bis(1,2-dimethylindole-3-yl) ethylene-2-yl]-3-(4-dimethylaminophenyl)-phthalide (Compound 1)

2-(4-Dimethylaminobenzoyl)benzoic acid (22.0g, 0.08 mole) and 1,1-bis(1,2-dimethylindole-3-yl)ethylene (25.2 g, 0.08 mole) were mixed in acetic anhydride (150 ml) using a mechanical stirrer and the reaction mixture was heated at 80°0 C. for 2 hours; cooled to room temperature; poured into a mixture of ice/water/sodium hydroxide; pH was adjusted to 8.0 by adding sodium hydroxide; the precipitated solid was filtered and washed with water. After drying, the solid was recrystallized from 1,2-dichloroethane/isopropanol. Yield: 40.2 g (89%); off white solid, m.p.: 242–245° C.

Example 2

Preparation of 3-[1,1-bis(1-ethyl-2,5-dimethylindole-3-yl)ethylene-2-yl]-3-(4-diethylaminophenyl)-phthalide (Compound 3)

2-(4-Diethylaminobenzoyl)benzoic acid (9.0 g, 0.03 mole) and 1,1-bis(2,5-dimethyl-1-ethylindole-3-yl)ethylene (11.1 g, 0.03 mole) in acetic anhydride (60 ml) were heated at 80° C. with stirring for 2 hours. Then, the reaction mixture was cooled to room temperature and poured with stirring onto ice and aqueous sodium hydroxide. After standing for 2–3 hours, the precipitated solid was filtered and dried. The dried crude product was dissolved in 1,2-dichloroethane, filtered and the filtrate was diluted with isopropanol; cooled in an ice bath. The solid formed was filtered and dried. Yield: 16.5 g (84%), white solid, m.p.: 213–215° C.

Example 3

Preparation of 3-[1,1-bis(1-ethyl-5-methoxy-2-methylindole-3-yl)ethylene-2-yl]-3-(4-diethylaminophenyl)phthalide (Compound 7)

2-(4-Diethylaminobenzoyl)benzoic acid (3.0 g, 0.01 mole) and 1,1-bis(1-ethyl-5-methoxy-2-methylindole-3-yl) ethylene (4.0 g, 0.01 mole) in 1,2-dichloroethane (20 ml) and acetic anhydride (20 ml) were heated at 100° C. (oil bath temperature) for 4 hours. The reaction mixture was cooled to room temperature; treated with ice, toluene and aqueous sodium hydroxide (10%); stirred at 60° C. for 30 minutes; toluene layer separated and the aqueous layer extracted twice with toluene. The toluene extracts were combined, washed twice with hot water, dried and concentrated. The residue was chromatographed on silica gel using toluene and toluene:acetone::4:1 as eluents. Fractions containing the blue band were collected, combined and concentrated. The residue was recrystallized from 1,2-dichloroethane/methanol. The product was obtained as a white solid, m.p.: 217–219° C; Yield: 5.5 g (81%).

Examples 4–14

Thermally Imaging Coat Material Dispersions

Separate dispersions of chromogenic compound, acidic developer material, and sensitizer are prepared.

| Dispersion A - Chromogenic Material | Parts by weight |
| --- | --- |
| Chromogenic Material | 32.0 |
| Binder, 20% solution of Polyvinyl alcohol in water | 27.4 |
| Dispersing agents | 0.4 |
| Water | 40.2 |

Dispersion A1—Chromogenic Material is ODB-2
3-Di-n-butylamino-6-methyl-7-phenylaminofluoran Dispersion A2—Chromogenic Material is MIEP-17 (Compound 1)
3-[1,1-Bis(1,2-dimethylindole-3-yl)ethylene-2-yl]-3-(4-dimethylaminophenyl)phthalide Dispersion A3—Chromogenic Material is MIEP-23 (Compound 3)
3-[1,1-Bis(2,5-dimethyl-1-ethylindole-3-yl)ethylene-2-yl]-3-(4-diethylaminophenyl) phthalide Dispersion A4—Chromogenic Material is MIEP-39 (Compound 17)
3-[1,1-Bis(1-n-butyl-2,5-dimethylindole-3-yl)ethylene-2-yl]-3-(4-diethylaminophenyl) phthalide Dispersion A5—Chromogenic Material is MIEP-49 (Compound 5)
3-[1,1-Bis(2,5-dimethyl-1-ethylindole-3-yl)ethylene-2-yl]-3-(4-dimethylaminophenyl) phthalide Dispersion A6—Chromogenic Material is MIEP-2 (Compound 2)
3-[1,1-Bis(1-ethyl-2-methylindole-3-yl)ethylene-2-yl]-3-(4-diethylaminophenyl)phthalide Dispersion A7—Chromogenic Material is MIEP-1 (Compound 7)
3-[1,1-Bis(1-ethyl-5-methoxy-2-methylindole-3-yl)ethylene-2-yl]-3-(4-diethylaminophenyl)phthalide Dispersion A8—Chromogenic Material is MIEP-57 (Compound 11)
3-[1,1-Bis(5-chloro-1-ethyl-2-methylindole-3-yl)ethylene-2-yl]-3-(4-diethylaminophenyl)phthalide Dispersion A9—Chromogenic Material is MIEP-62 (Compound 15)
3-[1,1-Bis(2,7-dimethyl-1-ethyl-5-methoxyindole-3-yl)ethylene-2-yl]-3-(4-diethylaminophenyl)phthalide Dispersion A10—Chromogenic Material is ODB-2+MIEP-17 (Compound 1)

Dispersion A11—Chromogenic Material is ODB-2+MIEP-23 (Compound 3)

Dispersion A12—Chromogenic Material is ODB-2+MIEP-39 (Compound 17)

Dispersion A13—Chromogenic Material is ODB-2+MIEP-49 (Compound 5)

Dispersion A14—Chromogenic Material is ODB-2+MIEP-2 (Compound 2)

Dispersion A15—Chromogenic Material is ODB-2+MIEP-1 (Compound 7)

Dispersion A16—Chromogenic Material is ODB-2+MIEP-57 (Compound 11)

Dispersion A17—Chromogenic Material is ODB-2+MIEP-62 (Compound 15)

| Dispersion B - Acidic Material | Parts by weight |
| --- | --- |
| Acidic Material | 42.5 |
| Binder, 20% solution of Polyvinyl alcohol in water | 21.2 |
| Dispersing agents | 0.2 |
| Water | 36.1 |

Dispersion B1—Acidic Material is TGSA
Bis(3-Allyl-4-hydroxyphenyl)sulfone

| Dispersion C - Sensitizing Material | Parts by weight |
|---|---|
| Sensitizing Material | 42.5 |
| Binder, 20% solution of Polyvinyl alcohol in water | 21.2 |
| Dispersing agents | 0.2 |
| Water | 36.1 |

Dispersion C1—Sensitizing Material is DPE 1,2-Diphenoxyethane

| | Parts by weight |
|---|---|
| Coating Formulation 1 | |
| Dispersion A (Chromogenic Material) | 23.0 |
| Dispersion B (Acidic Material) | 33.5 |
| Dispersion C (Sensitizing Material) | 33.5 |
| Binder, SBR latex in water | 10.0 |
| Coating Formulation 2 | |
| Dispersion A (Chromogenic Material ODB-2) + | 18.0 |
| (Chromogenic Material MIEP-X) | 5.0 |
| Dispersion B (Acidic Material) | 33.5 |
| Dispersion C (Sensitizing Material) | 33.5 |
| Binder, SBR latex in water | 10.0 |

Example 4

Coating Formulation 1 using
Dispersion A1 (ODB-2)
Dispersion B1 (TGSA)
Dispersion C1 (DPE)

Example 5

Coating Formulation 1 using
Dispersion A2 (MIEP-17)
Dispersion B1 (TGSA)
Dispersion C1 (DPE)

Example 6

Coating Formulation 1 using
Dispersion A3 (MIEP-23)
Dispersion B1 (TGSA)
Dispersion C1 (DPE)

Example 7

Coating Formulation 1 using
Dispersion A4 (MIEP-39)
Dispersion B1 (TGSA)
Dispersion C1 (DPE)

Example 8

Coating Formulation 1 using
Dispersion A5 (MIEP49)
Dispersion B1 (TGSA)
Dispersion C1 (DPE)

Example 9

Coating Formulation 1 using
Dispersion A6 (MIEP-2)
Dispersion B1 (TGSA)
Dispersion C1 (DPE)

Example 9

Coating Formulation 1 using
Dispersion A6 (MIEP-2)
Dispersion B1 (TGSA)
Dispersion C1 (DPE)

Example 10

Coating Formulation 1 using
Dispersion A7 (MIEP-1)
Dispersion B1 (TGSA)
Dispersion C1 (DPE)

Example 11

Coating Formulation 1 using
Dispersion A8 (MIEP-57)
Dispersion B1 (TGSA)
Dispersion C1 (DPE)

Example 12

Coating Formulation 1 using
Dispersion A9 (MIEP-62)
Dispersion B1 (TGSA)
Dispersion C1 (DPE)

Example 13

Coating Formulation 2 using
Dispersion A10 (ODB-2+MIEP-17)
Dispersion B1 (TGSA)
Dispersion C1 (DPE)

Example 14

Coating Formulation 2 using
Dispersion A11 (ODB-2+MIEP-23)
Dispersion B1 (TGSA)
Dispersion C1 (DPE)

Example 15

Coating Formulation 2 using
Dispersion A12 (ODB-2+MIEP-39)
Dispersion B1 (TGSA)
Dispersion C1 (DPE)

Example 16

Coating Formulation 2 using
Dispersion A13 (ODB-2+MIEP-49)
Dispersion B1 (TGSA)
Dispersion C1 (DPE)

Example 17

Coating Formulation 2 using
Dispersion A14 (ODB-2+MIEP-2)
Dispersion B1 (TGSA)
Dispersion C1 (DPE)

Example 18

Coating Formulation 2 using
Dispersion A15 (ODB-2+MIEP-1)
Dispersion B1 (TGSA)
Dispersion C1 (DPE)

Example 19

Coating Formulation 2 using
Dispersion A16 (ODB-2+MIEP-57)
Dispersion B1 (TGSA)
Dispersion C1 (DPE)

Example 20

Coating Formulation 2 using
Dispersion A17 (ODB-2+MIEP-62)
Dispersion B1 (TGSA)
Dispersion C1 (DPE)

The examples 4–14 were coated @4.0 g/m². A topcoat was applied @3.0 g/m². The examples were then printed on the HOBART printer model 18VP. PCS and bar reflectance were both measured using a Webscan Trucheck Verifier Model TC-101 which scans @670 nm. The resultant average of 10 scans are recorded. Background values were measured using a Technidyne Opacimeter Model BNL-3. A release coat was applied @3.0 g/m² on top of the topcoat (see layer 4 in FIG. 3) and an adhesive coat was applied on the backside or second surface (see layer 7 in FIG. 3). The PCS and BNL values were recorded. These values are tabulated in the following table (see Table 1).

For purposes of the invention and claims hereof, the PCS, BNL and bar reflectance values are determined after the release coat and adhesive coats are applied. The printer has to image labels after the release coat and adhesive coat are applied. Using PCS, BNL and bar reflectance values determined after such coats are applied is believed more representative of the product characteristics.

The principles, preferred embodiments, and modes of preparation the present invention have been described in the foregoing specification. The invention which is intended to be protected herein, however, is not construed as limited to the particular forms disclosed, since these are to be regarded as illustrative than restrictive. Variations and changes can be made by those skilled in the art without departing from the spirit and scope of the invention.

TABLE 1

| | | Print Contrast Signal (PCS) | | BNL Background (%) | | Bar Reflectance @ 670 nm | |
| --- | --- | --- | --- | --- | --- | --- | --- |
| Example # | Chromogenic Material(s) | Before Release Coat and Adhesive Coat | After Release Coat and Adhesive Coat | Before Release Coat And Adhesive Coat | After Release Coat an Adhesive Coat | Before Release Coat and Adhesive Coat | After Release Coat and Adhesive Coat |
| 4 | ODB-2 | 76 | 71 | 91.7 | 87.2 | 24 | 27 |
| 5 | MIEP-17 | 88 | 92 | 92.1 | 85.8 | 11 | 7 |
| 6 | MIEP-23 | 90 | 96 | 90.9 | 86.0 | 9 | 3 |
| 7 | MIEP-39 | 88 | 95 | 66.5 | 49.6 | 7 | 2 |
| 8 | MIEP-49 | 89 | 96 | 87.3 | 79.1 | 9 | 3 |
| 9 | MIEP-2 | 90 | 96 | 79.9 | 68.5 | 7 | 2 |
| 10 | MIEP-1 | 92 | 97 | 89.2 | 80.2 | 6 | 2 |
| 11 | MIEP-57 | 96 | 98 | 93.1 | 89.6 | 4 | 1 |
| 12 | MIEP-62 | 96 | 98 | 34.0 | 10.2 | 3 | 2 |
| 13 | ODB-2 + MIEP-17 | 79 | 85 | 89.5 | 86.3 | 19 | 12 |
| 14 | ODB-2 + MIEP-23 | 86 | 90 | 89.5 | 87.4 | 13 | 8 |
| 15 | ODB-2 + MIEP-39 | 84 | 82 | 73.3 | 55.4 | 11 | 6 |
| 16 | ODB-2 + MIEP-49 | 86 | 85 | 84.5 | 80.5 | 12 | 12 |
| 17 | ODB-2 + MIEP-2 | 88 | 92 | 83.6 | 76.8 | 10 | 5 |
| 18 | ODB-2 + MIEP-1 | 95 | 96 | 89.2 | 85.2 | 5 | 4 |
| 19 | ODB-2 + MIEP-57 | 97 | 98 | 91.4 | 89.1 | 3 | 2 |
| 20 | ODB-2 + MIEP-62 | 95 | 97 | 49.1 | 34.4 | 2 | 1 |

What is claimed is:

1. Improved thermally imaged markings have a bar reflectance of less than 20 at 670 nanometers, a print contrast signal of at least 80 useful for optical scanning, and a BNL background of at least 75%, the markings being imaged on a linerless label stock by selective application of heat to form a machine readable pattern, the linerless label stock comprising a substrate having first and second surfaces, and having coatings on the first and second surfaces, the coatings on the first surface comprising a pressure sensitive adhesive, the coatings on the second surface comprising:

a thermally imaging coating, the thermally-imaging coating containing at least one chromogenic material, said chromogenic material being selected from compounds of the formula (I)

wherein $R_1$ and $R_2$ are selected from methyl, ethyl, aryl, aryl substituted with methyl, ethyl, methoxy, ethoxy or halogen, benzyl or benzyl with phenyl substituted with methyl, ethyl, methoxy, ethoxy or halogen, wherein $R_3, R_4, R_5$ and $R_6$ are selected from hydrogen, halogen, methyl, ethyl, methoxy, ethoxy or phenyl, wherein $R_7$ and $R_8$ are each independently selected from methyl or ethyl, wherein $R_9$ is selected from hydrogen, methoxy or ethoxy, wherein $R_{10}$ is selected from hydrogen, dimethylamino or diethylamino, wherein $R_{11}$ is methyl, and at least one developer, and, a release coat, the release coat having a low adherence to the pressure sensitive adhesive on the first surface.

2. The improved thermally imaged markings according to claim 1 wherein the release coat is applied over the thermally imaging coating.

3. The improved thermally imaged markings according to claim 1 wherein the release coat is applied over the pressure sensitive adhesive.

4. Linerless labelstock capable for forming thermally imaged markings have a bar reflectance of less than 20 at 670 nanometers, a print contrast signal of at least 80 useful for optical scanning, and a BNL background of at least 75%, the markings being imaged on a linerless label stock by selective application of heat to form a machine readable pattern, the linerless label stock comprising a substrate having first and second surfaces, and having coatings on the first and second surfaces, the coatings on the first surface comprising a pressure sensitive adhesive, the coatings on the second surface comprising:

a thermally imaging coating, the thermally-imaging coating containing at least one chromogenic material, said chromogenic material being selected from compounds of the formula (I)

wherein $R_1$ and $R_2$ are selected from methyl, ethyl, aryl, aryl substituted with methyl, ethyl, methoxy, ethoxy or halogen, benzyl or benzyl with phenyl substituted with methyl, ethyl, methoxy, ethoxy or halogen, wherein $R_3, R_4, R_5$ and $R_6$ are selected from hydrogen, halogen, methyl, ethyl, methoxy, ethoxy or phenyl, wherein $R_7$ and $R_8$ are each independently selected from methyl or ethyl, wherein $R_9$ is selected from hydrogen, methoxy or ethoxy, wherein $R_{10}$ is selected from hydrogen, dimethylamino or diethylamino, wherein $R_{11}$ is methyl, and at least one developer of the formula (II)

and, a release coat, the release coat having a low adherence to the pressure sensitive adhesive on the first surface.

5. The linerless label stock according to claim 4 wherein the thermally imaging coating comprises in addition a sensitizer.

6. The linerless label stock according to claim 5 wherein the sensitizer is selected 1,2-bis(3-methyl phenoxy)ethane, 1,2-bis (4-methylphenoxy)ethane, 1,2-diphenoxy ethane, N-acetoacetyl-o-toluidine, phenyl-1-hydroxy-2-naphthoate, dibenzyl oxalate and p-benzyl biphenyl.

7. Improved thermally imaging linerless label stock useful for optical scanning comprising a substrate having first and second surfaces, and having coatings on the first and second surfaces, the coatings on the first surface comprising a pressure sensitive adhesive, the coatings on the second surface comprising:

a thermally imaging coating, the thermally-imaging coating containing at least one developer of the formula (II)

and at least one, chromogenic material capable of converting under the application of heat and reactive contact with the acidic developer to a colored form having a bar reflectance of less than 20 at 670 nanometers, said chromogenic material being selected from compounds of the formula (I)

(I)

wherein $R_1$ and $R_2$ are selected from methyl, ethyl, aryl, aryl substituted with methyl, ethyl, methoxy, ethoxy or halogen, benzyl or benzyl with phenyl substituted with methyl, ethyl, methoxy, ethoxy or halogen, wherein $R_3, R_4, R_5$ and $R_6$ are selected from hydrogen, halogen, methyl, ethyl, methoxy, ethoxy or phenyl, wherein $R_7$ and $R_8$ are each independently selected from methyl or ethyl, wherein $R_9$ is selected from hydrogen, methoxy or ethoxy, wherein $R_{10}$ is selected from hydrogen, dimethylamino or diethylamino, wherein $R_{11}$ is methyl, and, a release coat, the release coat having a low adherence to the pressure sensitive adhesive on the first surface, wherein the linerless label stock when thermally imaged displaying a print contrast signal of at least 80 and a BNL background of at least 75%, wherein the label stock has a spiral roll configuration such that the pressure sensitive adhesive adheres to the release coat to maintain the roll configuration, and wherein the stock may be peeled off the roll at the outer end of the roll.

8. The thermally imaging linerless label stock according to claim 7 wherein the chromogenic material comprises:

9. The thermally imaging linerless label stock according to claim 7 wherein the chromogenic material comprises:

10. The thermally imaging linerless label stock according to claim 7 wherein the chromogenic material comprises:

11. The thermally imaging linerless label stock according to claim 7 wherein the chromogenic material comprises:

12. The thermally imaging linerless label stock according to claim 7 wherein the substrate is cut into individual rectangular or quadrate labels, the side edge of the substrate forming the side edge of the labels.

13. The thermally imaging linerless label stock according to claim 7 wherein the second surface is positioned as the inward face of the spiral roll.

14. The thermally imaging linerless label stock according to claim 7 wherein the second surface is positioned as the outward face of the spiral roll.

15. The thermally imaging linerless label stock according to claim 7 comprising in addition a tie coat between the pressure sensitive adhesive and first surface.

16. Improved thermally imaging linerless label stock useful for optical scanning comprising a substrate having first and second surfaces, and having coatings on the first and second surfaces, the coatings on the first surface comprising a pressure sensitive adhesive, the coatings on the second surface comprising:

a thermally imaging coating, the thermally-imaging coating containing at least one chromogenic material, the thermally imaging linerless label stock when imaged having a bar reflectance of less than 20 at 670 nanometers, a print contrast signal of at least 80 useful for optical scanning, and a BNL background of at least 75%, said chromogenic material being selected from compounds of the formula (I)

(I)

wherein $R_1$ and $R_2$ are selected from methyl, ethyl, aryl, aryl substituted with methyl, ethyl, methoxy, ethoxy or halogen, benzyl or benzyl with phenyl substituted with methyl, ethyl, methoxy, ethoxy or halogen, wherein $R_3, R_4, R_5$ and $R_6$ are selected from hydrogen, halogen, methyl, ethyl, methoxy, ethoxy or phenyl, wherein $R_7$ and $R_8$ are each independently selected from methyl or ethyl, wherein $R_9$ is selected from hydrogen, methoxy or ethoxy, wherein $R_{10}$ is selected from hydrogen, dimethylamino or diethylamino, wherein $R_{11}$ is methyl, and including at least one developer for the formula (II)

(II)

and, a release coat, the release coat having a low adherence to the pressure sensitive adhesive on the first surface wherein the label stock has a Z fold stack configuration such that the pressure sensitive adhesive adheres to the release coat to maintain the Z fold stack configuration, and wherein the stock may be peeled off the stack at the outer end of the stack.

17. The linerless label stock according to claim 16 wherein the thermally imaging coating comprises in addition a sensitizer.

18. The linerless label stock according to claim 16 wherein the sensitizer is selected from 1,2-bis(3-methyl phenoxy)ethane, 1,2-bis (4-methylphenoxy)ethane, 1,2-diphenoxyethane, N-acetoacetyl-o-toluidine, phenyl-1-hydroxy-2-naphthoate, dibenzyl oxalate and p-benzyl biphenyl.

* * * * *